United States Patent
Ohashi

Patent Number: 5,291,222
Date of Patent: Mar. 1, 1994

[54] IMAGE EXPOSURE APPARATUS

[75] Inventor: Tsuyoshi Ohashi, Hashima, Japan

[73] Assignee: Brother Kogyo Kabushiki Kaisha, Nagoya, Japan

[21] Appl. No.: 858,854

[22] Filed: Mar. 27, 1992

[30] Foreign Application Priority Data

May 13, 1991 [JP] Japan .................. 3-107325

[51] Int. Cl.$^5$ .................................. H04N 1/21
[52] U.S. Cl. ..................................... 346/108
[58] Field of Search ............. 346/1.1, 76 L, 107 R, 346/108, 160; 358/296, 298, 300, 302, 412, 413

[56] References Cited

U.S. PATENT DOCUMENTS 5,059,987 10/1991 Takeyama et al. ............ 346/108
5,194,879 3/1993 Kotabe et al. ................ 346/108

Primary Examiner—Mark J. Reinhart
Attorney, Agent, or Firm—Oliff & Berridge

[57] ABSTRACT

An image exposure apparatus capable of having a semiconductor laser device emits a beam with increasing intensity so that the device will not be destroyed inadvertently. In operation, a switching device of the apparatus allows a reference signal from a reference clock generator to control a photosensitive body moving device for movement. Because the reference clock signal has the same frequency as that of an expected beam detection signal, the photosensitive body moving device starts driving a photosensitive body normally. In time, a beam generator generates a beam of a predetermined intensity. This allows the beam detection signal to be detected correctly and the photosensitive body moving device to reach a predetermined rotating speed as per the reference clock signal. After the beam detection signal starts to be detected correctly, the switching device allows the beam detection signal to be output instead of the reference clock signal. The switching is followed by a normal operation in which the photosensitive body moving device is controlled precisely in speed, and the exposure beam is accurately aligned with each scanning line position. Thereafter, the modulating operation based on a modulation signal commences, allowing an image to be exposed onto the photosensitive body.

17 Claims, 7 Drawing Sheets

IMAGE EXPOSURE APPARATUS

BACKGROUND OF THE INVENTION

1. Field of the Invention

The present invention relates to an image exposure apparatus and, more particularly, to an image exposure apparatus that scans a photosensitive body with an irradiating light beam.

2. Description of the Prior Art

Figure 9:
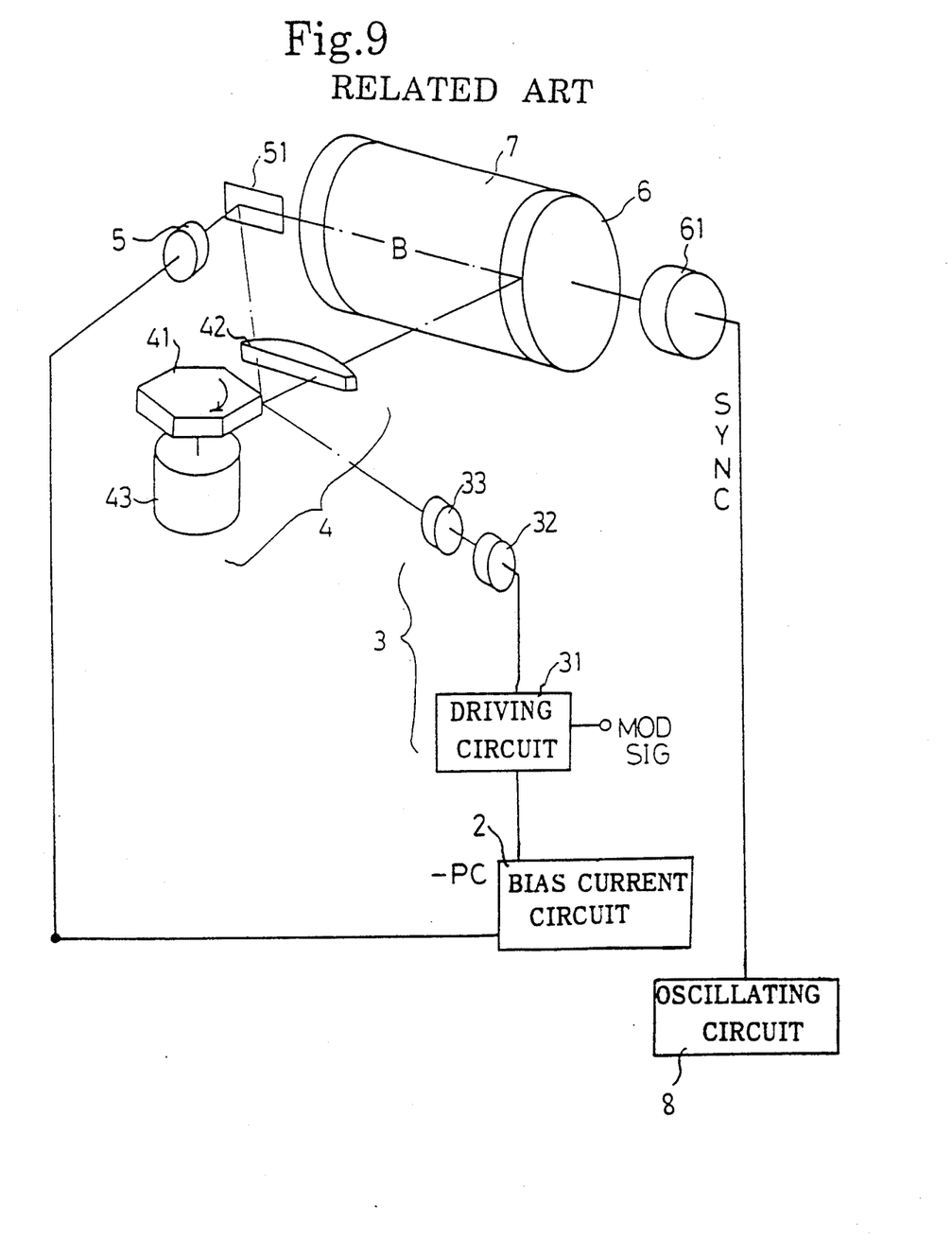
FIG. 9 is a view showing the overall construction of a prior art image exposure device.

FIG. 9 shows a typical prior art image exposure apparatus that scans a photosensitive body by irradiating the photosensitive body with a light beam. In FIG. 9, a rotating drum 6 is driven by a drum driving unit 61 that uses an input clock signal as its synchronizing signal (SYNC). The rotating drum 6 rotates at a constant speed. Photosensitive paper 7 is wrapped around the surface of the rotating drum 6. A scanner 4 comprises: a motor 43 that rotates at a predetermined rotating speed; a rotating polygon mirror 41 rotated in an arrowed direction A by the motor 43; and an f-θ lens 42 for converting a laser beam moving at an isometric speed into a beam that moves at a constant speed over the surface B of the photosensitive paper 7. A laser beam generator 3 comprises a driving circuit 31, a semiconductor laser device 32 and a collimator lens 33.

The driving circuit 31 drives the semiconductor laser device 32 which then emits a laser beam. The laser beam emitted by the semiconductor laser device 32 is converted into a beam of parallel rays by the collimator lens 33. A mirror 51, located close to the rotating drum 6, causes the laser beam to enter a beam detector 5 before the beam scans the photosensitive paper 7 for exposure.

The control timings of the above prior art image exposure apparatus are provided as follows. The rotating polygon mirror 41 and the rotating drum 6 operate on a reference clock signal output by an oscillating circuit 8. The image signal is modulated with reference to the time when the beam detector 5 detects the beam. That is, after a lapse of a predetermined time from a reference time, the laser beam starts to be modulated. In this manner, the image signal for each scanning line is aligned in terms of an output start position.

Provision of the proper control timings is needed for the following reason. In order to form an image on the photosensitive body after repeated scanning thereof by the laser beam, it is necessary to begin beam modulation at exactly the time at which each scanning action starts on the photosensitive body. Otherwise, the misalignment of the polygon mirror or the related parts thereof upon each scanning action may prevent that action from commencing at the proper position on the photosensitive drum. Without being properly timed, the resultant image can include rough, blurred edges.

The above drawback is circumvented by enhancing repeatability in two scanning directions. In the horizontal scanning direction, the modulation begins every time a beam detection signal comes in. In the vertical scanning direction, the reference clock signal is transmitted to the drum driving unit 61 so that the latter will drive the rotating drum 6 according to the timing of that signal. These measures are intended to expose the photosensitive paper to laser beam scanning with high accuracy and quality.

Figure 7:
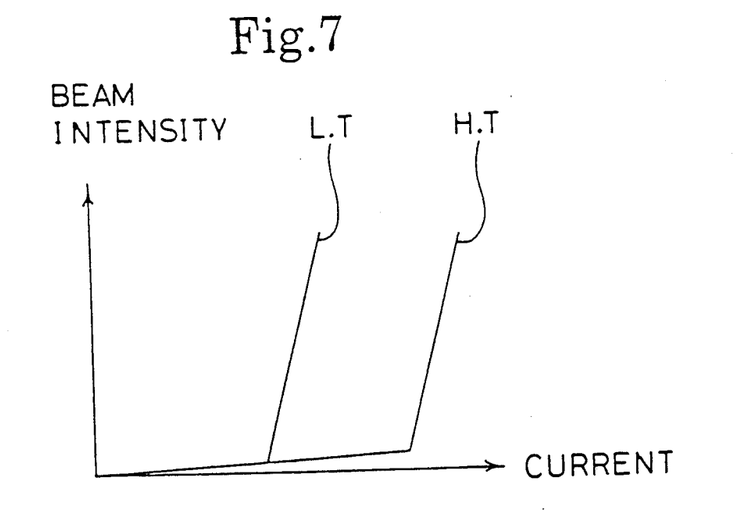
FIG. 7 is a view illustrating the characteristics of a semiconductor laser device used in the embodiment.

In the prior art image exposure apparatus, the semiconductor laser device is generally small-sized and has the advantage of being capable of direct modulation. However, the laser device is not without its share of disadvantages. One of such disadvantages is that, as depicted in FIG. 7, the intensity of the laser beam can vary significantly by the fluctuation in threshold current. The fluctuation is caused by changes in temperature and occurs over time even as the semiconductor laser device is being driven at the same current level. In addition to the varying beam intensity due to the temperature change and other factors, the semiconductor laser device is vulnerable to destruction caused by an excess current or excess output. At a low temperature in particular, the threshold current becomes small and thus tends to promote an excess output that often destroys the expensive semiconductor laser device.

The above disadvantage has been avoided by setting a low initial value of the beam intensity when the semiconductor laser device is started. Once the laser device is activated, the beam intensity is raised in steps up to a predetermined normal level for laser emission.

In order to implement high-quality exposure of high repeatability with the above prior art image exposure apparatus, it is conventionally necessary to control the rotating drum 6 with respect to the timing of beam detection by the beam detector 5. Specifically, a beam detection signal is sent to the drum driving unit 61 so that the latter will drive the rotating drum 6 according to the timing of that signal. This corrects the rotating misalignment of the rotating polygon mirror 41 and the like for control over scanning in the vertical direction.

Where the rotating drum 6 is rotated according to the timing of beam detection by the beam detector 5, the beam intensity is initially set to a low level so that the intensity will be raised later in steps, as mentioned above. This connotes that when the semiconductor laser device is started, the emission therefrom is so low that it cannot be detected by the beam detector 5. Therefore this image exposure apparatus cannot control the rotating drum 6 with respect to the timing of beam detection by the beam detector 5.

If the beam intensity is initially set to a level high enough for the beam detector to detect beam emission upon activation of the semiconductor laser device, the above-mentioned excess output is likely to occur, destroying the costly device.

SUMMARY OF THE INVENTION

It is therefore an object of the present invention to overcome the above-described drawbacks and disadvantages of the prior art and to provide an image exposure apparatus comprising a semiconductor laser device that emits a laser beam at gradually increasing intensity without any possibility of destruction of that device.

It is another object of the invention to provide an image exposure apparatus that controls the driving of a photosensitive drum without any laser beam emission or with a very low emission from a semiconductor laser device upon activation thereof.

In carrying out the invention and according to one aspect thereof, there is provided an image exposure apparatus comprising: beam generating means for generating a beam modulated by a modulation signal, an intensity of the beam being raised gradually from a sufficiently low level to a predetermined level by the beam generating means after activation thereof; scanning means for causing the beam generated by the beam generating means to scan a photosensitive body; beam detecting means for detecting the arrival of the beam caused to scan by the scanning means at a predetermined position, the beam detecting means further generating a beam detection signal upon detecting the arrival of the beam at the predetermined position; photosensitive body moving means for moving the photosensitive body at a predetermined speed in accordance with an appropriate reference signal; reference clock generating means for generating a clock signal serving as a reference; and switching means for switching from the clock signal generated by the reference clock generating means to the beam detection signal generated by the beam detecting means for use as the reference signal for the photosensitive body moving means, the switching being performed after a lapse of a predetermined period of time following the activation of the beam generating means; wherein the photosensitive body moving means is driven, during the predetermined period of time following the activation of the beam generating means, in accordance with the clock signal generated by the reference clock generating means; the photosensitive body moving means being further driven, after a lapse of the predetermined period of time following the activation of the beam generating means, in accordance with the beam detection signal detected by the beam detecting means.

In the inventive image exposure apparatus, the beam generating means generates the laser beam modulated by the modulation signal. After starting, the beam generating means gradually raises the beam intensity from a sufficiently low level to the normal level. The scanning means causes the laser beam from the beam generating means to scan the photosensitive body. The beam detecting means detects the arrival of the laser beam caused to scan by the scanning means at the predetermined position and, upon detection of such arrival, generates the beam detection signal.

After activation of the beam generating means, the switching means causes the photosensitive body moving means to be driven by the clock signal from the reference clock generating means. Because the clock signal has the same frequency as the beam detection signal expected, the photosensitive body moving means is driven normally thereby. Subsequently, the beam generating means starts emitting a laser beam of the normal intensity, which allows the beam detection signal to be correctly detected. The clock signal also causes the photosensitive body moving means to reach a predetermined rotating speed.

After the beam detection signal is correctly detected, the switching means switches from the clock signal to the beam detection signal. After the switching, the initial phase operation is replaced by the normal phase operation in which the photosensitive body moving means is controlled precisely in speed. This readies the exposure beam for precise alignment with each scanning line.

Thereafter, the modulation of the laser beam by the modulation signal is started, and an image is exposed onto the photosensitive body.

Further objects, features and advantages of the invention will become more apparent upon a reading of the following description and appended drawings.

BRIEF DESCRIPTION OF THE DRAWINGS

The invention will be described in detail with reference to the following figures, wherein.

DETAILED DESCRIPTION OF THE PREFERRED EMBODIMENT

One preferred embodiment of the invention will now be described with reference to the accompanying drawings.

Figure 1:
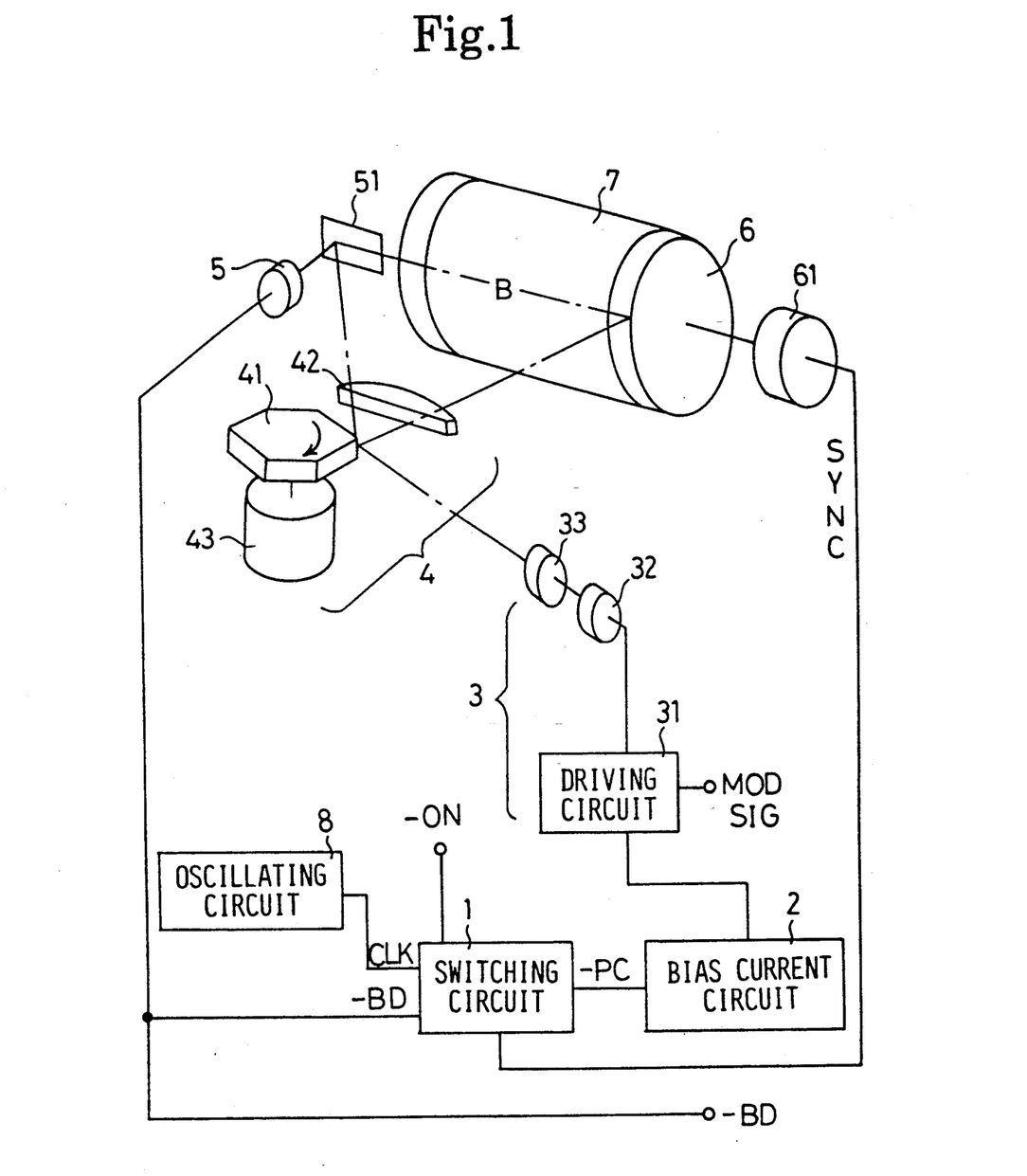
FIG. 1 is a view showing the overall construction of an image exposure apparatus embodying the present invention.

FIG. 1 depicts the overall construction of an image exposure apparatus according to the present invention for use with a known electrophotographic image forming equipment. In FIG. 1 and in FIG. 9 showing the prior art example, like reference characters designate like or corresponding parts.

A rotating drum 6 is driven at a constant speed by a drum driving unit 61 that operates on an input signal used as its synchronizing signal (SYNC). Photosensitive paper 7 is wound around the surface of the rotating drum 6.

Figure 2:
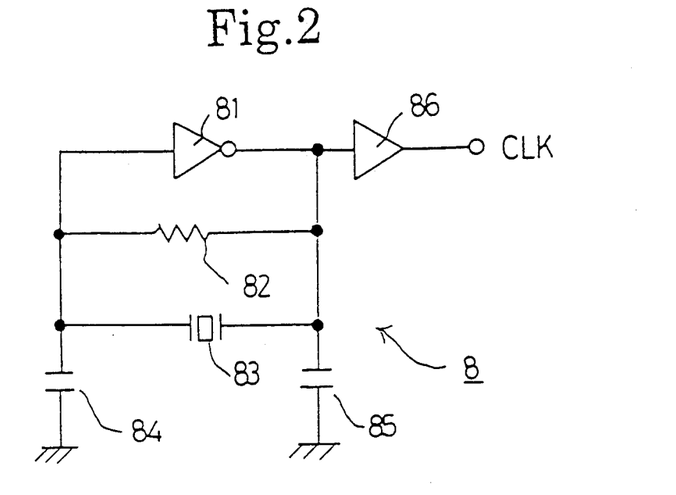
FIG. 2 is a circuit diagram of an oscillating circuit used in the embodiment.

An oscillating circuit 8 is of a conventional type constructed as shown in FIG. 2. The oscillating circuit 8 comprises an inverter 81, a resistor 82, a crystal oscillator 83, capacitors 84 and 85, and an output buffer 86. The circuit 8 generates a reference clock signal (CLK) whose frequency is the same as that of a beam detection signal (−BD; the sign "−" represents negative logic hereunder).

Figure 3:
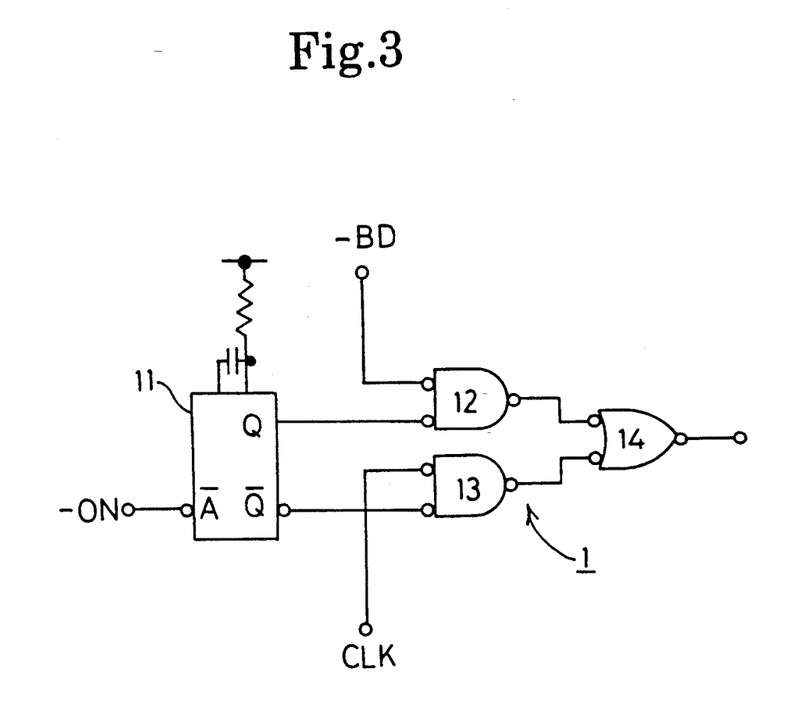
FIG. 3 is a circuit diagram of a switching circuit used in the embodiment.

A switching circuit contains a one-shot multivibrator 11 and gates 12, 13 and 14, as depicted in FIG. 3. An externally input operation start signal (−ON) triggers the operation of the one-shot multivibrator 11 for a predetermined period of time (D) so that either the clock signal (CLK) or the beam detection signal (−BD) will be output after switching to one of the signals. The output of the switching circuit 1 comprises the synchronizing signal (SYNC) for the drum driving unit 61 and a control start signal (−PC) indicating the start of the operation of a bias current circuit 2, to be described below.

Figure 4:
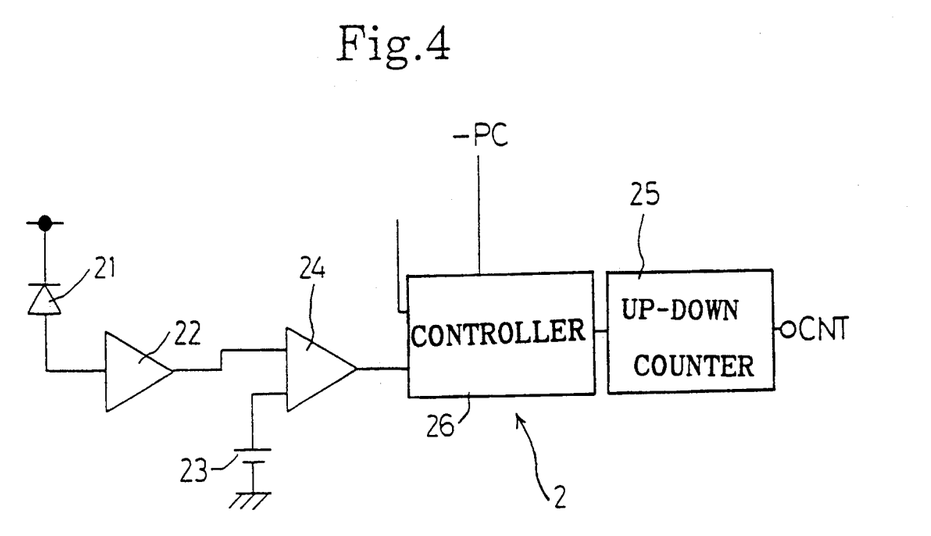
FIG. 4 is a view depicting the construction of a bias current circuit used in the embodiment.

The bias current circuit 2 is structured as shown in FIG. 4. Specifically, the bias current circuit 2 comprises: a monitor photodiode 21 which is incorporated in a semiconductor laser device 32 to be described later and which converts the light received from the semiconductor laser device 32 into a monitor current; an amplifier circuit 22 for converting the monitor current into a voltage for amplification; a comparator 24 for comparing the voltage from the amplifier circuit 22 with a reference voltage 23, thereby determining the intensity of a laser beam; an up-down counter 25 operating on a high frequency clock; and a controller 26 for controlling the counting of the up-down counter 25 by use of the control start signal (−PC).

The count (CNT) of the up-down counter 25 corresponds to the bias current. Upon power-up, the up-down counter 25 is initialized to a sufficiently low value (CNT INIT). The bias current circuit 2 starts the control operation, to be described hereinafter, using the output signal from the switching circuit 1 as the control start signal (−PC). Activated in this manner, the bias current circuit 2 works to maintain the intensity of the laser beam.

Figure 5:
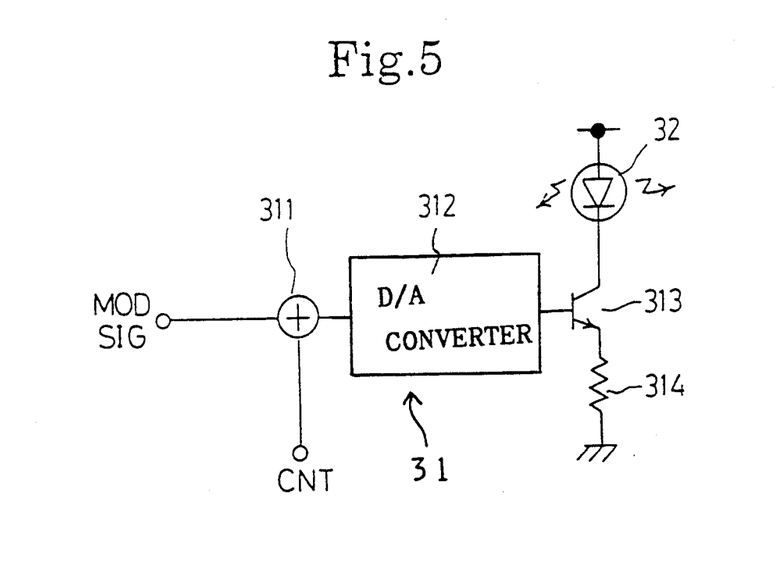
FIG. 5 is a view illustrating the construction of a driving circuit used in the embodiment.

A laser beam generator 3 comprises a driving circuit 31, a semiconductor laser device 32 and a collimator lens 33. The driving circuit 31 drives the semiconductor laser device 32. The laser beam thus emitted by the semiconductor laser device 32 enters the collimator lens 33 which in turn generates the laser beam in the form of a beam of parallel rays. As shown in FIG. 5, the driving circuit 31 comprises: an adder 311 for adding an externally input modulation signal (MOD SIG) and the count (CNT) of the up-down counter 25 in the bias current circuit 2; a D/A converter 312 for converting the sum of the output of adder 311 into an analog signal; a transistor 313; and a resistor 314.

The laser beam generator 3 operates as follows. The adder 311 adds the input modulation signal (MOD SIG) and the count (CNT) of the up-down counter 25 in the bias current circuit 2. The result is converted by the D/A converter 312 into an analog voltage. The analog voltage is in turn applied to the transistor 313 to drive the semiconductor laser device 32.

A scanner 4 comprises: a motor 43 that rotates at a predetermined rotating speed; a rotating polygon mirror 41 rotated by the motor 43 in the arrowed direction A of FIG. and an f-θ lens 42 for causing the laser beam moving at an isometric speed to scan the surface B of the photosensitive paper 7 at a constant speed.

A mirror 51 is located close to the rotating drum 6. Before the laser beam scans the photosensitive paper 7 for exposure of the photosensitive paper, the mirror 51 causes the beam to enter the beam detector 5.

Figure 6:
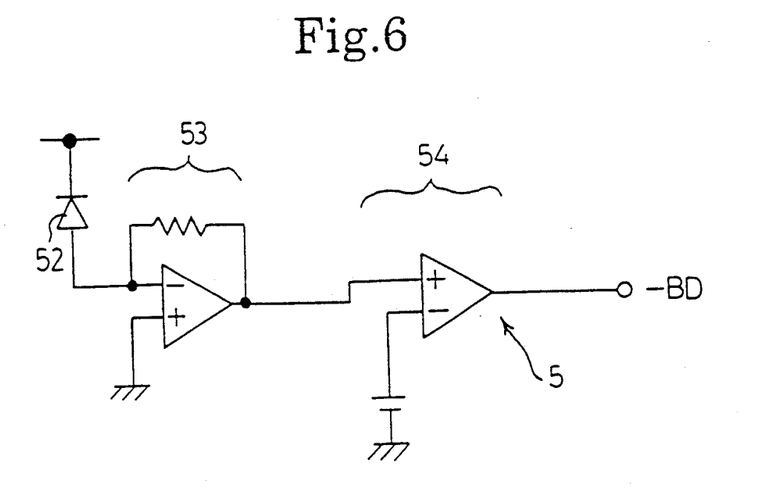
FIG. 6 is a circuit diagram of a beam detector used in the embodiment.

As illustrated in FIG. 6, the beam detector 5 comprises a photodiode 52, an amplifier circuit 53, and a comparator 54 for comparing the output of the circuit 53 with a reference voltage. Upon receipt of a laser beam, the beam detector generates a beam detection signal (−BD).

The image exposure apparatus embodying the present invention is used in conjunction with a known electrophotographic image forming equipment. This equipment provides exposure of an image to be formed on the photosensitive paper 7 by use of known charging and developing units and other components, not shown and not elaborated on herein.

The operation of the embodiment will now be described with reference to FIGS. 1 through 8.

When power is applied to the image exposure apparatus in this embodiment, the up-down counter 25 in the bias current circuit 2 is initialized and loaded with a sufficiently low count (CNT INIT). This count is a value representative of a bias current small enough to prevent inadvertent destruction of the semiconductor laser device 32.

Before exposure of the image, an operation start signal (−ON) is issued by an external control section, not shown. Upon receipt of the operation start signal, the switching circuit 1 allows the clock signal (CLK) from the oscillating circuit 8 to be output for the period of time defined by a time constant (D) of the one-shot multi-vibrator 11. This time constant (D) is an appropriate value that satisfies the following relation:

$$D > T$$

where, T represents a predetermined period of time. That is, the output of the switching circuit 1 remains the clock signal (CLK) during the time (D).

Thereafter, the bias current circuit 2 receives the clock signal (CLK) as the control start signal (−PC) and, every time the clock signal is input, adjusts the bias current to correct the laser beam intensity to a predetermined level.

More specifically, the controller 26 of the bias current circuit 2 fixes the modulation signal to a predetermined value once the control operation is started, and lowers the count (CNT) of the up-down counter 25 by a predetermined value N in order to reduce the intensity of the laser beam.

The emission from the semiconductor laser device 32 is received by the photodiode 21 and amplified by the amplifier circuit 22. The emission is then compared with the reference voltage 23 by the comparator 24. The result of the comparison, i.e., whether the laser emission is greater or smaller in intensity than the reference value, is input to the controller 26. In response, the controller 26 lowers the count of the up-down counter 25 by the value N. Subsequently, the controller 26 raises the count of the up-down counter 25 in increments of 1, until the comparator 24 judges that the reference voltage 23 has been exceeded. As the count is raised, the intensity of the laser beam is augmented from its sufficiently low level up to a level commensurate with the reference voltage 23. When the reference voltage 23 is reached, the raising of the count stops and the control operation comes to an end.

If the intensity of the laser beam fails to reach the predetermined level after the controller 26 raises the count of the up-down counter 25 by 2N, the controller 26 terminates the control operation for the current clock signal. However, the value N is set to be sufficiently high in comparison with the fluctuation in threshold current. As a result, unless something occurs abnormal to the semiconductor laser device 32, the intensity of the laser beam always reaches the predetermined level. That is, the count is allowed to vary by as much as ±1 for one clock signal.

The initial value of the up-down counter 25 is set to be sufficiently low. Once the control operation is started, the up-down counter 25 is controlled so that the beam intensity will be gradually raised. That is, the intensity of the emission from the semiconductor laser device 32 is very low immediately after the start of the control operation. The emission intensity is raised over a certain period of time before the normal level of emission intensity is reached. After the intensity of the emission from the semiconductor laser device 32 has reached the normal level, the up-down counter 25 of the bias current circuit 2 has its value (CNT) varied so as to maintain the output of the device 32 constant. In conjunction with the change in counter value, the bias current applied to the modulation signal (MOD SIG) is also varied so as to maintain a constant laser beam intensity. Thus as shown in FIG. 7, the intensity of the laser beam is maintained even as the characteristics of the semiconductor laser device 32 fluctuate due to a temperature change and/or other factors.

The situation in which the threshold current has become large at a high temperature while the current which drives the semiconductor laser device 32 and which corresponds to the initial value of the up-down counter 25 is smaller than the threshold current is described. The resulting low intensity of the laser beam would make it impossible for the beam detector 5 to detect the laser beam upon start of the control operation. In such a case, a clock signal from the oscillating circuit 8 allows the bias current circuit 2 to proceed with the control operation. Conversely, if the threshold current has become low at a low temperature, the initial current is held small enough to protect the semiconductor laser device 32 from destruction.

The drum driving unit 61 drives the rotating drum 6 using the output signal from the switching circuit 1 as the synchronizing signal (SYNC). Because the clock signal (CLK) is the same in frequency as the beam detection signal (−BD), the drum driving unit 61 starts driving the rotating drum 6 properly and brings it to a normal rotating speed.

After a lapse of the predetermined period of time (T), the bias current circuit 2 causes the laser beam generator 3 to generate a laser beam of a predetermined intensity. The beam detection signal (−BD) starts being detected at each scanning action, while the rotating drum 6 reaches its normal rotating speed. The predetermined period of time (T) is the time at which semiconductor laser device 38 can emit the laser beam at the predetermined normal intensity level under the temperature.

After a lapse of the appropriate period of time (D) following the start of exposure, the output of the switching circuit 1 switches from the clock signal (CLK) to the beam detection signal (−BD). The switching is followed by a normal operation in which the photosensitive body 7 is scanned for exposure by the laser beam modulated by the modulation signal (MOD SIG). The control operation of the bias current circuit 2 is carried out at the normal timing, with the beam detection signal (−BD) used as the control start signal (−PC). By this time, the rotating drum 6 has been controlled by the drum driving unit 61 with respect to theoretical speed and phase. When the beam detection signal (−BD) is switched to as the reference for driving control, the scanning position of the exposure beam is aligned precisely with the scanning line position through appropriate correction.

Using the beam detection signal (−BD) as the control start signal (−PC), the bias current circuit 2 adjusts the bias current every time the signal (−BD) is input. This is done so as to correct the laser beam intensity to the appropriate level.

The externally input modulation signal (MOD SIG) causes the modulating operation to be started after a lapse of the predetermined time following the detection of the beam detection signal. The modulating operation exposes an image onto the photosensitive body 7.

Figure 8:
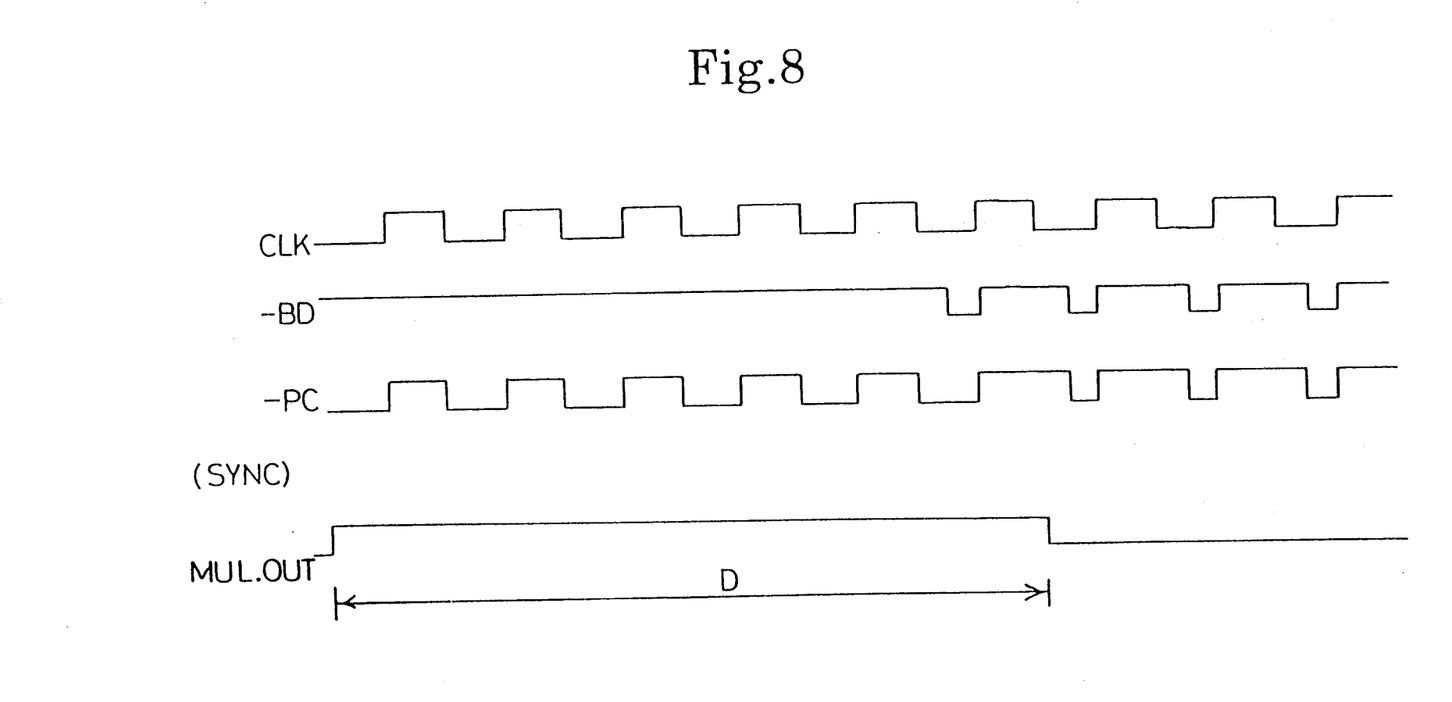
FIG. 8 is a timing chart in effect when the embodiment operates.

FIG. 8 is a timing chart of the signals described above. As depicted in FIG. 8, the switching circuit 1 upon power-up allows the clock signal (CLK) of the oscillating circuit 8 to be output in place of the beam detection signal (−BD). The clock signal initiates the operation of the bias current circuit 2. Using this clock signal, the drum driving circuit 61 drives the rotating drum 6. Because the clock signal has the same frequency as that of the beam detection signal (−BD), the bias current circuit 2 and the rotating drum 6 start operating normally.

After a lapse of the predetermined period of time (T), the bias current circuit 2 causes the laser beam generator 3 to generate a laser beam of the normal intensity. The beam detection signal (−BD) is correctly detected at each scanning action. The rotating drum 6 reaches its predetermined rotating speed.

After a period of time (D) longer than the time (T), the switching circuit causes the beam detection signal (−BD) to be output in place of the clock signal (CLK). After the operation of switching circuit 1, the normal operation is performed wherein the rotating drum 6 is controlled precisely in terms of speed and phase. The exposure beam is thus aligned accurately with each scanning line position.

Thereafter, the modulating operation based on the modulation signal (MOD SIG) begins, and the image is exposed onto the photosensitive body 7.

Although the description above contains many specificities, these should not be construed as limiting the scope of the invention but as merely providing illustrations of the presently preferred embodiment of this invention. For example, the above embodiment involves having the bias current circuit 2 provide a single control operation for each scanning action. Alternatively, one control operation may be carried out for every two scanning actions. Although the above embodiment utilizes the rotating drum, a plate or the like bearing a photosensitive body on the surface thereof and moving in parallel may alternatively be utilized in place of the drum.

As described, the image exposure apparatus according to the invention uses the clock signal instead of the beam detection signal upon power-up in order to start the control operation for maintaining a constant beam intensity and in order to drive the photosensitive drum. This scheme allows the beam control means of the apparatus to gradually raise the bias current in such a way that protects the expensive semiconductor laser device incorporated therein from inadvertent destruction.

What is claimed is:

1. An image exposure apparatus comprising:

beam generating means for generating a beam, the beam having an intensity which is raised gradually from a low level to a predetermined level higher than said low level;

scanning means for causing the beam generated by said beam generating means to scan a photosensitive body;

beam detecting means for detecting the arrival of the beam caused to scan by said scanning means at a predetermined position, said beam detecting means further generating a beam detection signal upon detecting the arrival of the beam at the predetermined position;

photosensitive body moving means responsive to a reference signal for moving the photosensitive body at a predetermined speed, said reference signal comprising one of a clock signal and the beam detection signal;

clock generating means for generating the clock signal; and switching means for switching said reference signal from said clock signal generated by said clock generating means to said beam detection signal generated by said beam detecting means, said switching means performing said switching at a predetermined period of time after operation of said beam generating means begins;

wherein said photosensitive body moving means is driven in accordance with the clock signal generated by said clock generating means, during the predetermined period of time after operation of said beam generating means begins; said photosensitive body moving means being further driven in accordance with the beam detection signal generated by said beam detecting means, after a lapse of the predetermined period of time after the operation of said beam generating means begins.

2. The image exposure apparatus according to claim 1, wherein said clock signal and said beam detection signal have substantially the same frequency.

3. The image exposure apparatus according to claim 1, wherein said switching means comprises a one-shot multivibrator, an operation of said multivibrator being triggered by an externally input operation start signal.

4. The image exposure apparatus according to claim 1, further comprising a bias current circuit for maintaining beam intensity, including:
  a monitor photodiode which converts light from said beam generating means into a monitor current;
  amplifying means for converting the monitor current into an amplification voltage;
  comparator means for comparing the amplification voltage with a reference voltage to determine beam intensity;
  up-down counting means which operates on a high frequency clock, said up-down counting means having a count which is varied depending upon the beam intensity determined by said comparator means; and
  controller means for controlling counting of said up-down counting means, said bias current circuit outputting a bias current for maintaining beam intensity.

5. The image exposure apparatus according to claim 4, wherein said controller means controls the counting to decrement the count of the up-down counting means when said comparator means determines that said amplification voltage exceeds said reference voltage.

6. The image exposure apparatus according to claim 5, wherein said controller means controls the counting to increment the count of the up-down counting means when said comparator means determines that said amplification voltage is lower than said reference voltage.

7. The image exposure apparatus according to claim 6, wherein said controller means ceases incrementing the counting when beam intensity fails to reach a predetermined level after said controller means increments the count of said up-down counting means to a predetermined amount.

8. An image exposure apparatus comprising:
  a semiconductor laser device for generating a beam;
  scanning means for causing the beam generated by said semiconductor laser device to scan a surface of a photosensitive body;
  a beam detector for detecting the arrival of the beam caused to scan by said scanning means at a predetermined position on a rotating drum bearing the photosensitive body and for generating a beam detection signal upon detecting the beam arrival;
  a bias current circuit including,
  a photodiode for monitoring an intensity of the beam generated by said semiconductor laser device;
  a comparator for determining if the intensity of the beam monitored by said photodiode exceeds a predetermined intensity value; and
  an up-down counter set to a sufficiently small value immediately after said semiconductor laser device begins to generate the beam, said up-down counter having a count thereof decremented when said comparator determines that the intensity of the beam has exceeded the predetermined intensity value, said up-down counter having the count thereof incremented when said comparator determines that the intensity of the beam remains below the predetermined intensity value;
  wherein said bias current circuit outputs a bias current corresponding to the count of said up-down counter in order to maintain the intensity of the beam generated by said semiconductor laser device at a time when a first reference signal is detected, said first reference signal comprising one of a clock signal and the beam detection signal;
  a driving circuit for adding the bias current from said bias current circuit and an externally input image signal and providing an output indicative thereof, said driving circuit driving said semiconductor laser device in accordance with the output of the driving circuit;
  a drum driving unit for rotating the rotating drum at a predetermined rotating speed corresponding to a second reference signal, said second reference signal comprising one of the clock signal and the beam detection signal;
  an oscillating circuit for generating the clock signal; and
  a switching circuit for switching said second reference signal from said clock signal to said beam detection signal, said switching circuit also switching said first reference signal for the bias current circuit from the clock signal to the beam detection signal, the switching circuit concurrently switching said first and second reference signals at a predetermined period of time after said semiconductor laser device begins to generate the beam;
  wherein said clock signal is said first and second reference signals during the predetermined period of time after said semiconductor laser device begins to generate the beam, and said beam detection signal is said first and second reference signals after the predetermined period of time after the semiconductor laser device begins to generate the beam.

9. The image exposure apparatus according to claim 8, wherein said clock signal and said beam detection signal have substantially the same frequency.

10. The image exposure apparatus according to claim 8, wherein said switching circuit includes a one-shot multivibrator, an operation of said multivibrator being triggered by an externally input operation start signal.

11. The image exposure apparatus according to claim 8, wherein said bias current circuit includes a controller for controlling the count of said up-down counter, said controller ceasing incrementing the count when the intensity of the beam fails to reach a predetermined level after said controller increments the count of said up-down counter to a predetermined amount.

12. An image exposure apparatus for exposing a photosensitive body comprising:
  beam emitting means for emitting a beam having an intensity to expose said photosensitive body;

beam control means for controlling said beam emitting means, the intensity of the beam being raised gradually from a low level so as not to destroy the beam emitting means to a predetermined level higher than said low level so as to adequately expose said photosensitive body by said beam emitting means after an activation of said beam emitting means;

scanning means for causing the beam emitted by said beam emitting means to scan the photosensitive body in a direction of main scanning at a predetermined scanning cycle;

beam detecting means for detecting an arrival of the beam caused to scan by said scanning means at a predetermined position, said beam detecting means further generating a beam detection signal upon detecting the arrival of the beam at the predetermined position;

reference clock generating means for generating a clock signal, said clock signal having a cycle substantially being the same as said scanning cycle;

photosensitive body moving means for moving the photosensitive body in a direction of sub scanning at a predetermined speed in accordance with a reference signal, said reference signal being one of the clock signal and the beam detection signal; and switching means for switching said reference signal from the clock signal to the beam detection signal, said switching means switching said reference signal after detecting the beam detection signal emitted by said beam detecting means;

wherein said photosensitive body moving means is driven in accordance with the clock signal generated by said reference clock generating means, before said beam detection signal is detected; said photosensitive body moving means being further driven in accordance with the beam detection signal detected by said beam detecting means, after said beam detection signal is detected.

13. The image exposure apparatus according to claim 12, wherein said switching means comprises a one-shot multivibrator, an operation of said multivibrator being triggered by an externally input operation start signal.

14. The image exposure apparatus according to claim 12, wherein said beam control means includes a bias current circuit, said bias current circuit comprising:
 a photodiode which converts light from said beam emitting means into a monitor current;
 amplifying means for converting the monitor current into an amplification voltage;
 comparator means for comparing the amplification voltage with a reference voltage to determine beam intensity;
 an up-down counter having a count which is varied depending upon the beam intensity determined by said comparator means; and
 a controller for controlling the count of said up-down counter, said bias current circuit providing a bias current for maintaining beam intensity.

15. The image exposure apparatus according to claim 14, wherein said controller controls the count to decrement the count of the up-down counter when said comparator means determines that said amplification voltage exceeds said reference voltage.

16. The image exposure apparatus according to claim 15, wherein said controller controls the count to increment the count of the up-down counter when said comparator means determines that said amplification voltage is lower than said reference voltage.

17. The image exposure apparatus according to claim 16, wherein said controller ceases incrementing the count when beam intensity fails to reach a predetermined level after said controller increments the count of said up-down counter to a predetermined amount.

* * * * *